(12) United States Patent
Chu

(10) Patent No.: US 9,088,139 B2
(45) Date of Patent: Jul. 21, 2015

(54) FIVE-DIRECTION SWITCH BASE STRUCTURE

(71) Applicant: Ching-Hsiung Chu, Taipei (TW)

(72) Inventor: Ching-Hsiung Chu, Taipei (TW)

( * ) Notice: Subject to any disclaimer, the term of this patent is extended or adjusted under 35 U.S.C. 154(b) by 67 days.

(21) Appl. No.: 14/080,818

(22) Filed: Nov. 15, 2013

(65) Prior Publication Data

US 2015/0136576 A1 May 21, 2015

(51) Int. Cl.
*H02B 1/26* (2006.01)
*H01H 9/02* (2006.01)
*H01H 71/08* (2006.01)

(52) U.S. Cl.
CPC . *H02B 1/26* (2013.01); *H01H 9/02* (2013.01); *H01H 71/08* (2013.01)

(58) Field of Classification Search
CPC ..... H01H 1/5805; H01H 9/02; H01H 13/702; H01H 1/26; H01H 71/08
USPC .................................................. 200/292–293
See application file for complete search history.

(56) References Cited

U.S. PATENT DOCUMENTS

| 6,144,001 | A   | * | 11/2000 | Green et al. ................... 200/304 |
| 7,495,534 | B2  | * | 2/2009  | Oh .................................... 335/6 |
| 7,701,313 | B2  | * | 4/2010  | Kim ............................... 335/202 |
| 7,973,625 | B2  | * | 7/2011  | Chandrappa et al. ......... 335/198 |
| 8,487,725 | B2  | * | 7/2013  | Takaya et al. ................. 335/202 |
| 8,514,041 | B2  | * | 8/2013  | Naka et al. .................... 335/202 |
| 2008/0246566 | A1 | * | 10/2008 | Oh ............................... 335/197 |

* cited by examiner

*Primary Examiner* — Michael Zarroli

(57) ABSTRACT

A five-direction switch base structure includes a bottom rest, four base components, and two outer covers. A self-luminous push switch is centrally selectively disposed at the bottom rest. The base components each have one side selectively disposed with a self-luminous tactile switch and another side corresponding in position to four sides of the bottom rest so as to be inserted into and fixed to the bottom rest to therefore form a base structural body. The two outer covers cover the self-luminous push switch from above such that, after the base components have been coupled together to form the base structural body, the base structural body and the self-luminous push switch are fixed to each other to form two connection layers. Hence, the base structural body comprising the bottom rest and the base components enables switch installation to take place in five directions, namely forward, backward, leftward, rightward, and upward.

15 Claims, 9 Drawing Sheets

FIVE-DIRECTION SWITCH BASE STRUCTURE

BACKGROUND OF THE INVENTION

1. Technical Field

The present invention relates to structural design of tactile switches, and more particularly, to a five-direction switch base structure operable in five directions, namely forward, backward, leftward, rightward, and upward.

2. Description of Related Art

A commercially-available two-stage switchable microswitch structure comprises: a base; an axial cylinder slidably disposed in the base; a receiving tank with an inner wall guiding and moving the axial cylinder to thereby enable the axial cylinder to attain a first position and a second position, wherein the receiving tank has therein a first electrode, a second electrode, and a third electrode; a conductive leaf spring disposed on the axial cylinder and movable to the first position or the second position together with the axial cylinder to come into contact with the first electrode and the third electrode and come into contact with the second electrode and the third electrode; and a light-emitting diode (LED) disposed in the axial cylinder, wherein a user presses the axial cylinder to electrically connect the first electrode to the third electrode or electrically connect the second electrode to the third electrode, thereby acquiring a sense of touch pertaining to two-stage switching and enhancing ease of use by emitting light from the LED.

Another commercially-available self-luminous tactile switch essentially comprises a seat, a base, an LED, and an embedding mold terminal and is characterized in that an n-shaped bend portion is disposed at each of the ends of conducting pins of the LED, such that the conducting pins of the LED can get connected to the embedding mold terminal twice consecutively, wherein the embedding mold terminal has a switch conducting terminal and LED positive and negative poles, such that circuit conduction begins by means of a round leaf spring as soon as a contact of the switch conducting terminal comes into contact with the round leaf spring, thereby allowing the LED to form a self-contained conducting mechanism by means of the self-contained feature of the embedding mold terminal.

The two aforesaid products indicate that conventional tactile switches operate mostly by a unidirectional mechanism from which additional functions can be derived but are seldom explored with a view to developing their multiple-direction operability. However, considering the increasingly diverse functions and intricate structures of electrical apparatuses nowadays, switches operating in a single direction are going to fall short of requirements and thus will inevitably drop out of the market in the near future.

BRIEF SUMMARY OF THE INVENTION

A five-direction switch base structure of the present invention essentially comprises a bottom rest, four base components, and two outer covers. The bottom rest has a self-luminous push switch selectively centrally disposed at the bottom rest. Below the self-luminous push switch is a plurality of pins electrically connected to a circuit board on which the five-direction switch base structure is mounted. The base components each have one side selectively disposed with a self-luminous tactile switch and the other side corresponding in position to the four sides of the bottom rest and thus fixed to the bottom rest, so as to form a base structural body. A pin group electrically connected to the circuit board is disposed below each of the base components. The two outer covers cover the self-luminous push switch from above; hence, after the base components have been coupled together to form the base structural body, the base structural body and the self-luminous push switch are fixed to each other so as to form two connection layers. Hence, the base structural body composed of the bottom rest and the base components has five switch installation directions, namely forward, backward, leftward, rightward, and upward, and a switch can be installed selectively in each of the directions to display various patterns.

Another objective of the present invention is to enable the base components to be inserted into a bottom rest component in a one-to-one manner such that the base components can be coupled together to form another base structural body. A side-by-side slide slot is disposed on one of the four sides of the bottom rest component. The side-by-side slide slot corresponds in position to a sliding rail of each of the base components. A snap-engaging portion and a snap-engaging slot are disposed on two opposing ones of the four sides of the bottom rest component, respectively. The snap-engaging portion is snap-engaged with the snap-engaging slot of another bottom rest component, such that the bottom rest components can be series-connected to display another series-connected side-by-side pattern independently.

DETAILED DESCRIPTION OF THE INVENTION

Figure 1:
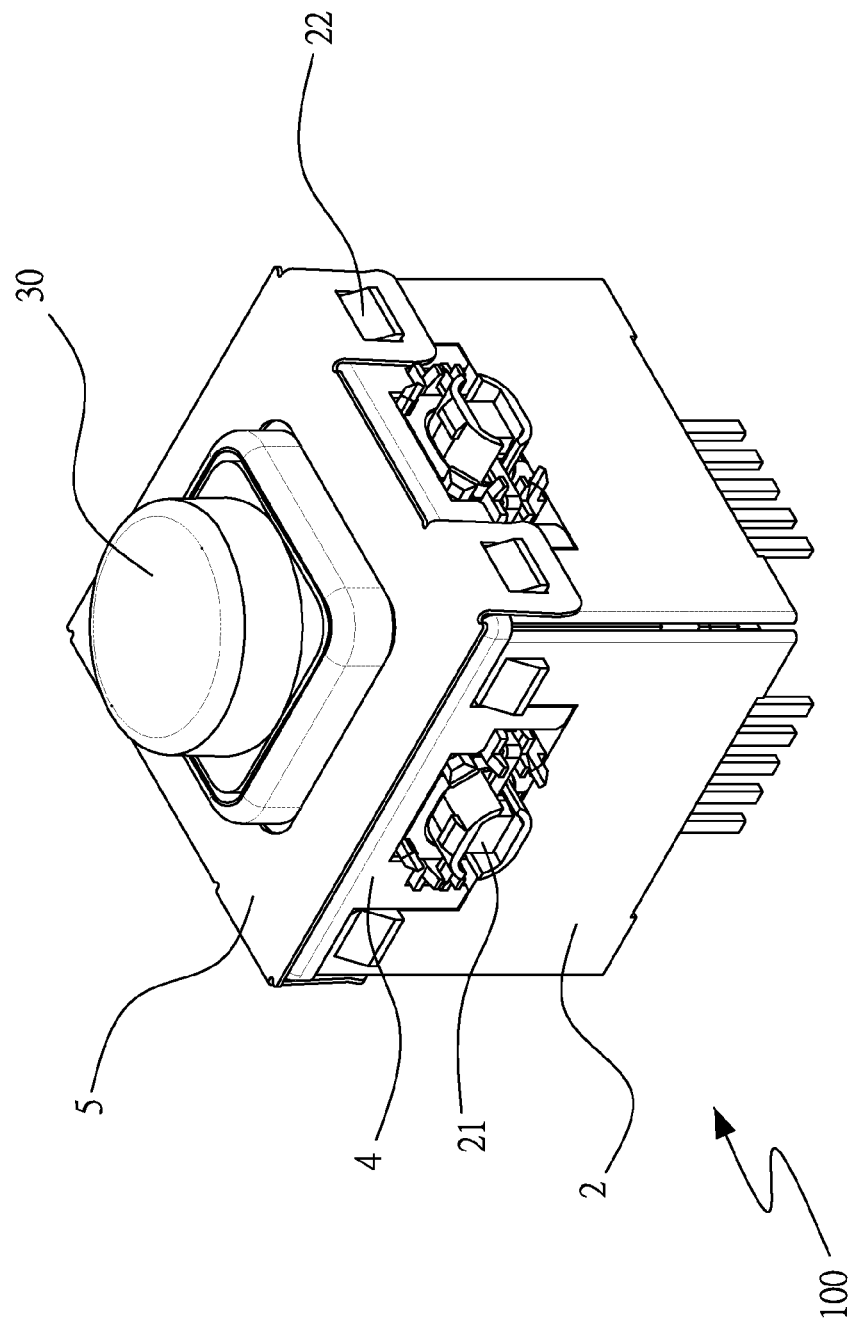
FIG. 1 is a schematic perspective view of a five-direction switch base structure according to the first embodiment of the present invention.
Figure 2:
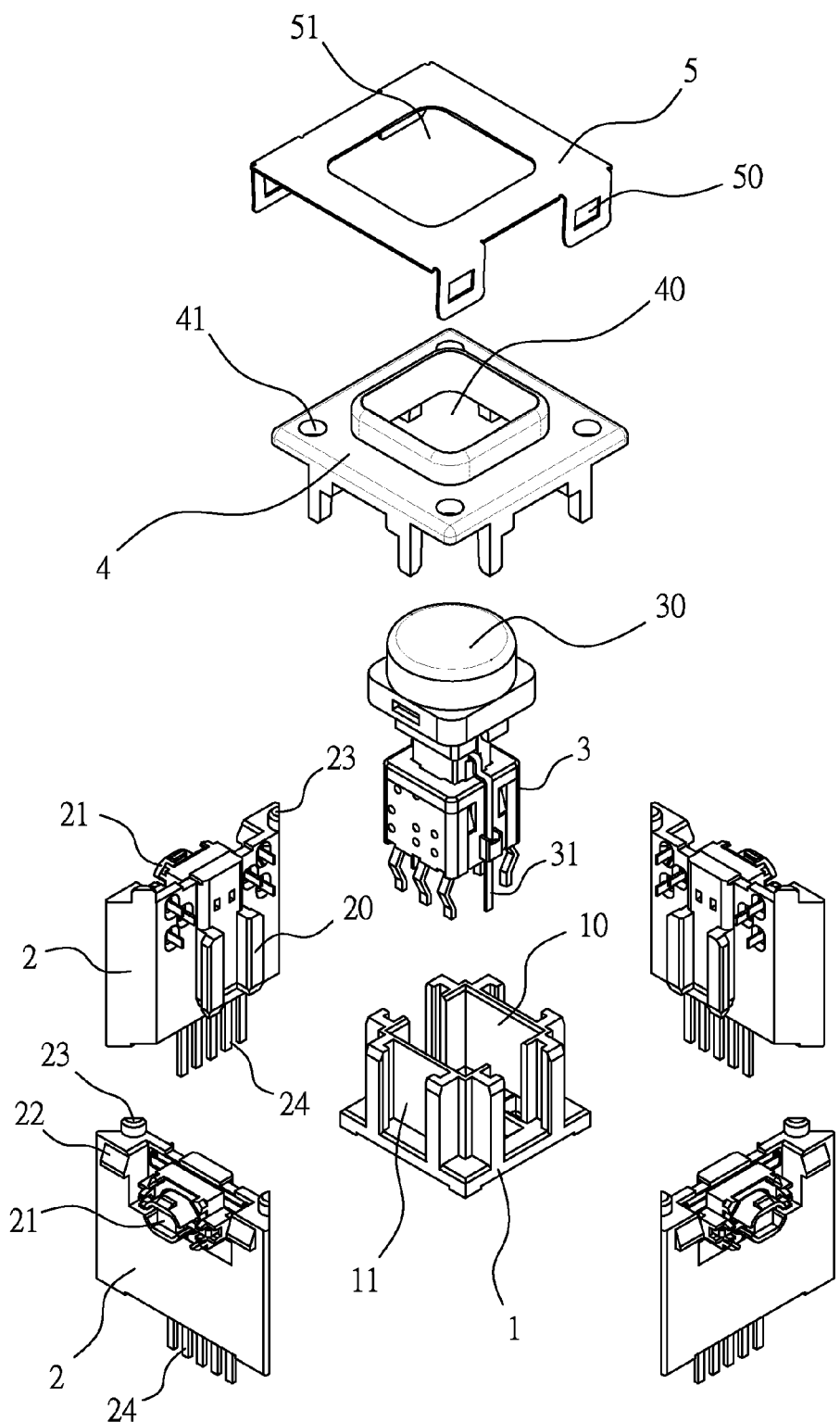
FIG. 2 is a schematic exploded view of the five-direction switch base structure according to the first embodiment of the present invention.
Figure 3:
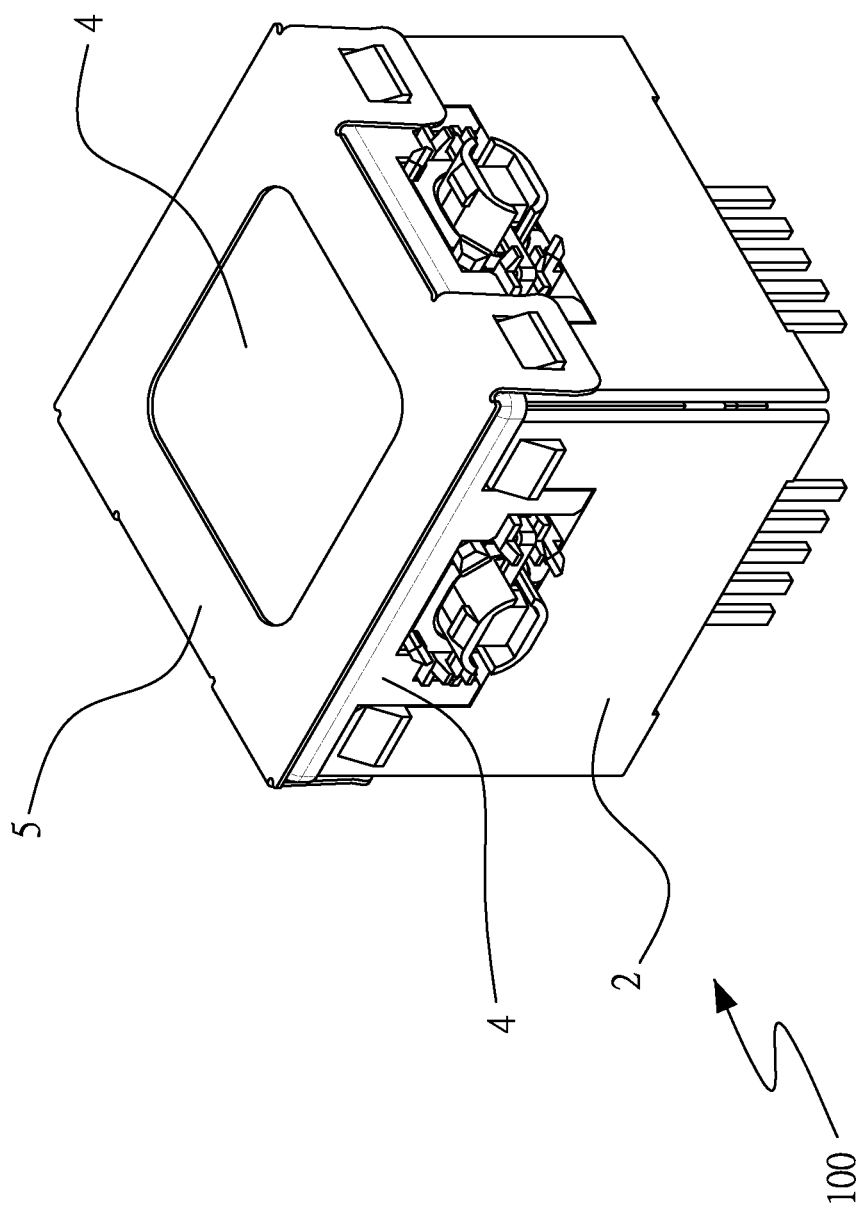
FIG. 3 is a schematic perspective view of the five-direction switch base structure according to the second embodiment of the present invention.
Figure 4:
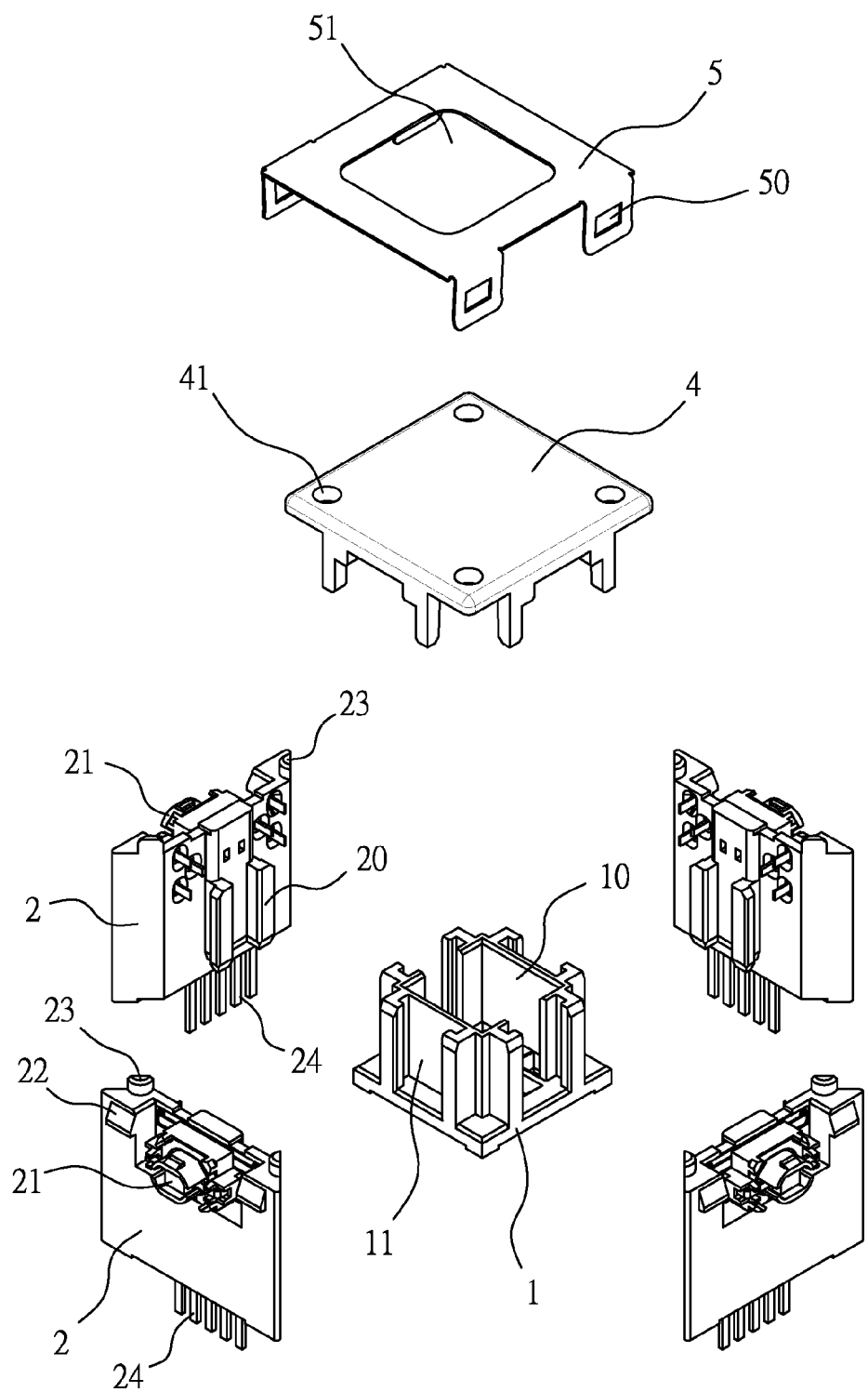
FIG. 4 is a schematic exploded view of the five-direction switch base structure according to the second embodiment of the present invention.
Figure 5:
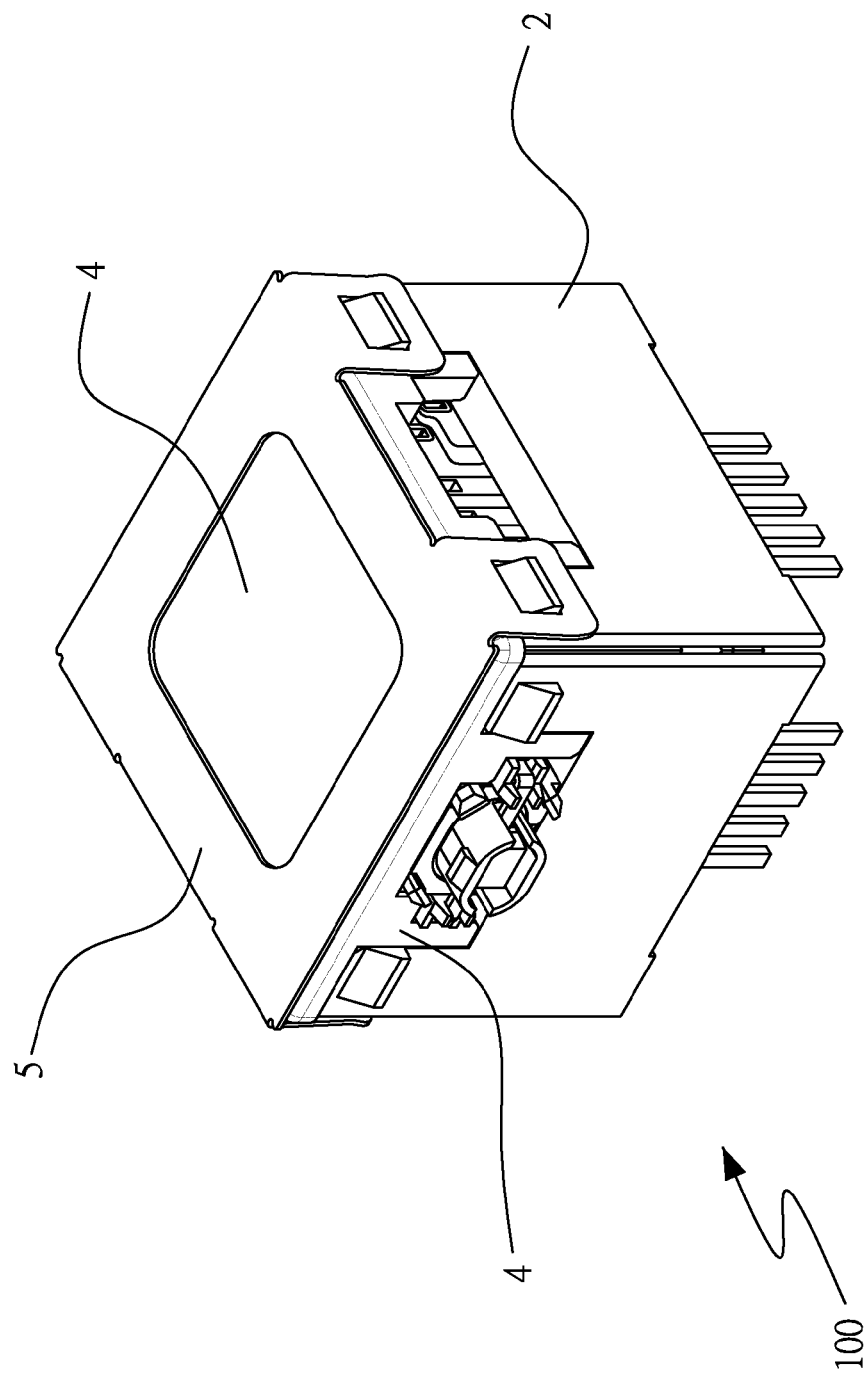
FIG. 5 is a schematic perspective view of the five-direction switch base structure according to the third embodiment of the present invention.
Figure 6:
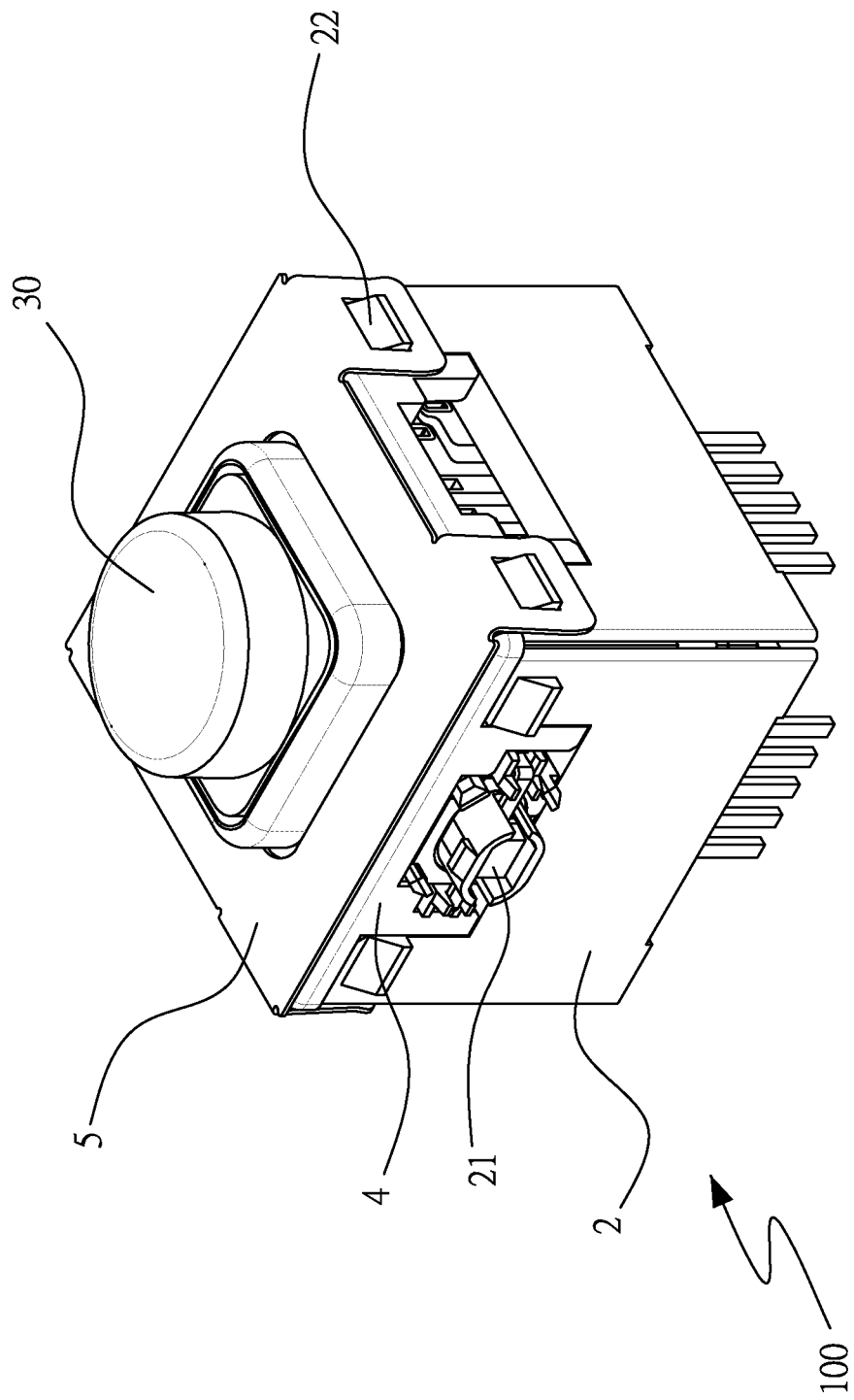
FIG. 6 is a schematic perspective view of the five-direction switch base structure according to the fourth embodiment of the present invention.

Referring to FIG. 1 and FIG. 2, there are shown a schematic perspective view and a schematic exploded view of a five-direction switch base structure 100 according to the first embodiment of the present invention. As shown in the diagrams, the five-direction switch base structure 100 of the present invention is adapted to be mounted on a circuit board and essentially comprises a bottom rest 1, four base components 2, a self-luminous push switch 3, a first outer cover 4 and a second outer cover 5. The bottom rest 1 defines centrally therein a receiving space 10 and has a slide slot 11 at each of the four sides of the bottom rest 1. The base components 2 each have one side disposed with a self-luminous tactile switch 21 and the other side disposed with a sliding rail 20. The sliding rail 20 corresponds in position to the slide slots 11 at the four sides of the bottom rest 1, such that the base components 2 can be inserted into the bottom rest 1 and fixed thereto to thereby form a base structural body. As a result, the self-luminous tactile switches 21 disposed at the four sides of the bottom rest 1 are displayed in four different directions, respectively. A pin group 24 is disposed below each of the self-luminous tactile switches 21. The pin groups 24 enable the self-luminous tactile switches 21 to be electrically connected to the circuit board on which the five-direction switch base structure 100 is mounted. The pin groups 24 are formed inside the base components 2 by means of embedding mold injection. That is to say, the pins of the self-luminous tactile switches 21 are folded to correspond in position to apertures (not shown) of the pin group 24 and then fixed in place by silver glue, such that the pins of the self-luminous tactile switch 21 extend outward to correspond in position to the pin group 24; hence, the pins can function as the pins of a switch. The base components 2 each have one side disposed with two hook-engaging protuberances 22 and are each disposed above with two snap-engaging raises 23. The two snap-engaging raises 23 are positioned proximate to the base components 2 and correspond in position thereto, respectively, such that the base components 2 are coupled together to form the base structural body and thereby form a single cylindrical raise.

The self-luminous push switch 3 is disposed in the receiving space 10 centrally defined at the bottom rest 1. The self-luminous push switch 3 has thereon a press cap 30. A user can press the press cap 30 from outside. Eight pins 31 are disposed below the self-luminous push switch 3. The pins 31 penetrate the bottom rest 1, such that the self-luminous push switch 3 is electrically connected to the circuit board on which the five-direction switch base structure 100 is mounted. The first outer cover 4 is made of a plastic and adapted to cover the self-luminous push switch 3 from above. The first outer cover 4 corresponds in position to the four sides of the bottom rest 1 and has a first through-hole 40 centrally disposed at the first outer cover 4 and four snap-engaging holes 41 disposed at the four corners of the first outer cover 4, respectively. The first through-hole 40 is penetrable by the self-luminous push switch 3 to expose the press cap 30. The snap-engaging holes 41 correspond in position to the cylindrical raise formed as a result of snap-engagement of the two snap-engaging raises 23 with the base components 2. Hence, after the base components 2 have been coupled together to the base structural body, the base structural body and the self-luminous push switch 3 are fixed to each other by the first outer cover 4 to thereby form a first connection layer.

The second outer cover 5 is made of a metal. Like the first outer cover 4, the second outer cover 5 not only covers the self-luminous push switch 3 from above but also has four sides. The second outer cover 5 has a second through-hole 51 disposed centrally at the second outer cover 5 and corresponding in position to the first through-hole 40. The bottoms of two opposing sides of the second outer cover 5 extend downward to form two hook-engaging holes 50. The second through-hole 51 is penetrable by the press cap 30 to expose the press cap 30. The hook-engaging holes 50 correspond in position to the two hook-engaging protuberances 22 snap-engaged with the base components 2. Hence, after the base components 2 have been coupled together to form the base structural body, the base structural body, the self-luminous push switch 3, and the first outer cover 4 are fixed to each other by the second outer cover 5 to therefore form a second connection layer.

Referring to FIG. 3 through FIG. 6, the five-direction switch base structure 100 of the present invention is characterized in that the bottom rest 1 and the base components 2 are coupled together to form the base structural body and thereby enable switch installation to take place in five directions, namely forward, backward, leftward, rightward, and upward, such that switches selectively installed in the directions are displayed in various patterns, respectively.

In the second embodiment of the present invention, the five-direction switch base structure 100 essentially comprises a bottom rest 1, four base components 2, a first outer cover 4, and a second outer cover 5. The bottom rest 1, the base components 2, and the second outer cover 5 in the second embodiment are identical to their counterparts in the first embodiment in terms of structure and connection, respectively, except that not only is the self-luminous push switch 3 of the first embodiment absent from the receiving space 10 of the bottom rest 1 of the second embodiment, but the first through-hole 40 of the first embodiment is not centrally disposed at the first outer cover 4 of the second embodiment. Hence, the upward installation direction is unavailable in the second embodiment of the present invention, and thus the five-direction switch base structure 100 in the second embodiment of the present invention has only four installation directions, namely forward, backward, leftward, and rightward.

In the third embodiment of the present invention, the five-direction switch base structure 100 essentially comprises a bottom rest 1, four base components 2, a first outer cover 4, and a second outer cover 5. The bottom rest 1, the base components 2, the first outer cover 4, and the second outer cover 5 in the third embodiment are identical to their counterparts in the second embodiment in terms of structure and connection, respectively, except that one, two, or three of the base components 2 of the third embodiment are selectively not equipped with the self-luminous tactile switch 21 of the second embodiment, such that the five-direction switch base structure 100 in the third embodiment of the present invention has only three, two, or one of the installation directions, namely forward, backward, leftward, and rightward.

In the fourth embodiment of the present invention, the five-direction switch base structure 100 essentially comprises a bottom rest 1, four base components 2, a self-luminous push switch 3, a first outer cover 4, and a second outer cover 5. The bottom rest 1, the base components 2, the self-luminous push switch 3, the first outer cover 4, and the second outer cover 5 in the four embodiment are identical to their counterparts in the first embodiment in terms of structure and connection, respectively, except that one, two, three of the base components 2 of the fourth embodiment are selectively not equipped with the self-luminous tactile switch 21 of the first embodiment, such that the five-direction switch base structure 100 in the fourth embodiment of the present invention has only four, three, or two of installation directions, namely forward, backward, leftward, rightward, and upward.

Figure 7:
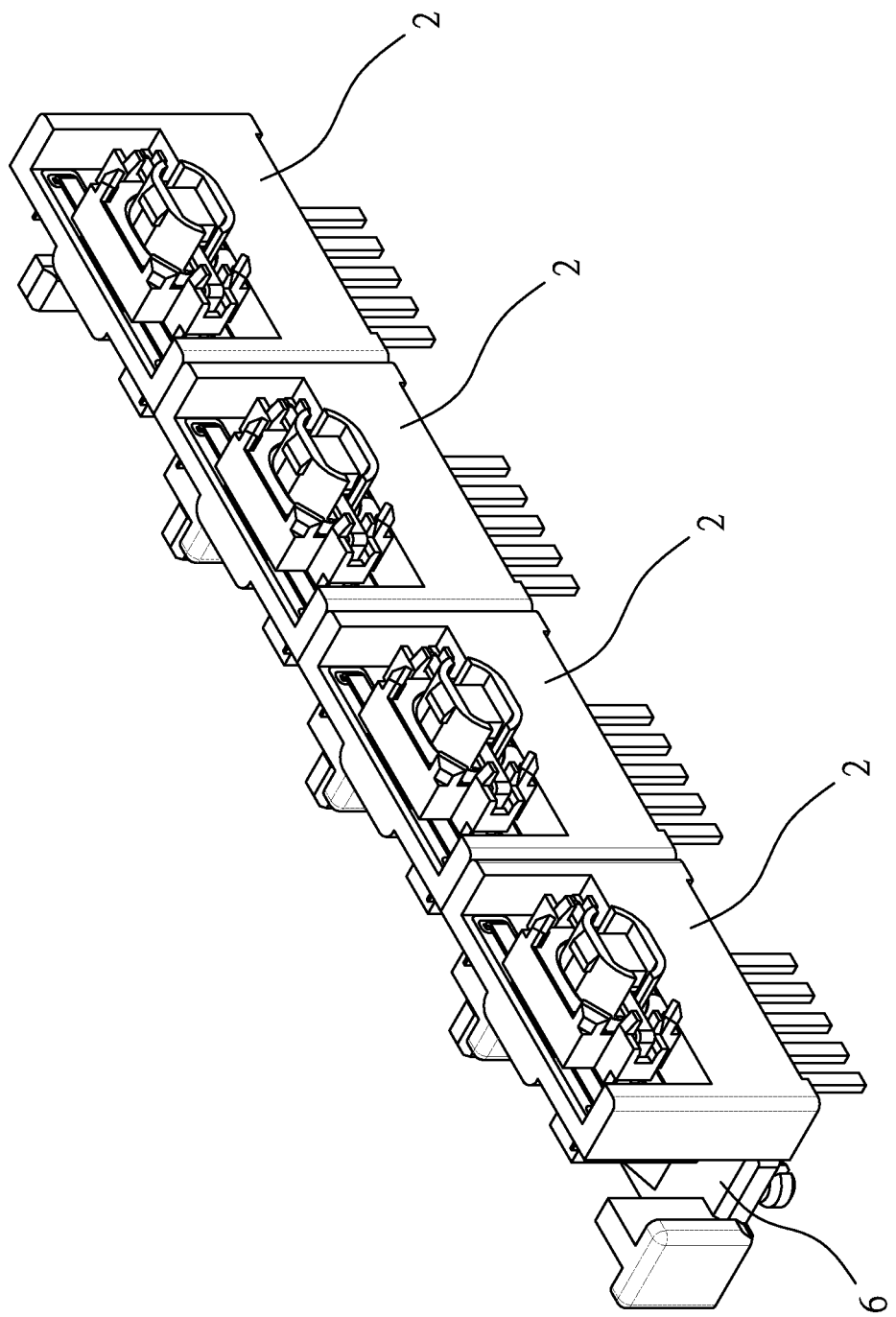
FIG. 7 is a schematic view of the five-direction switch base structure assembled according to the fifth embodiment of the present invention.
Figure 8:
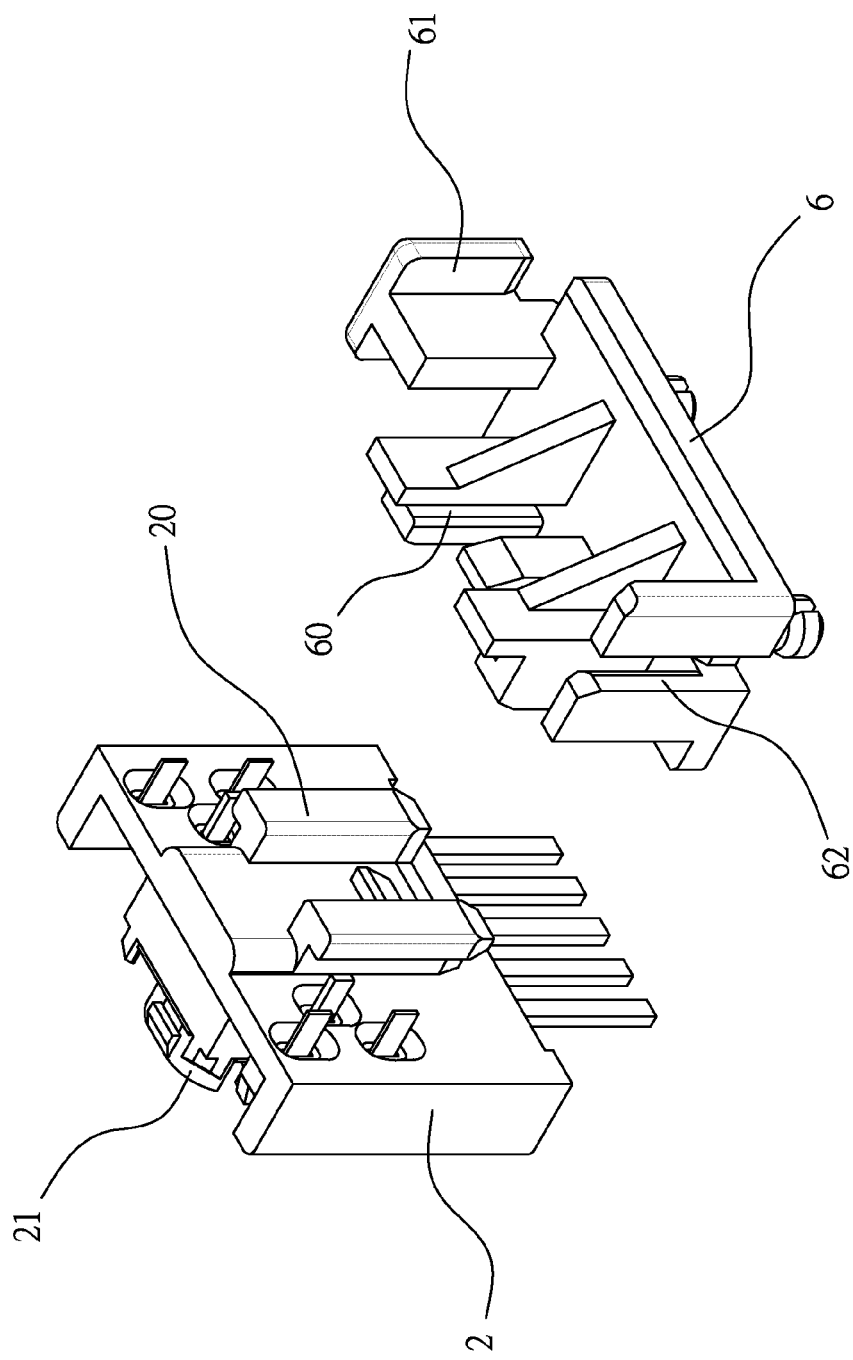
FIG. 8 is another schematic view of the five-direction switch base structure assembled according to the fifth embodiment of the present invention.
Figure 9:
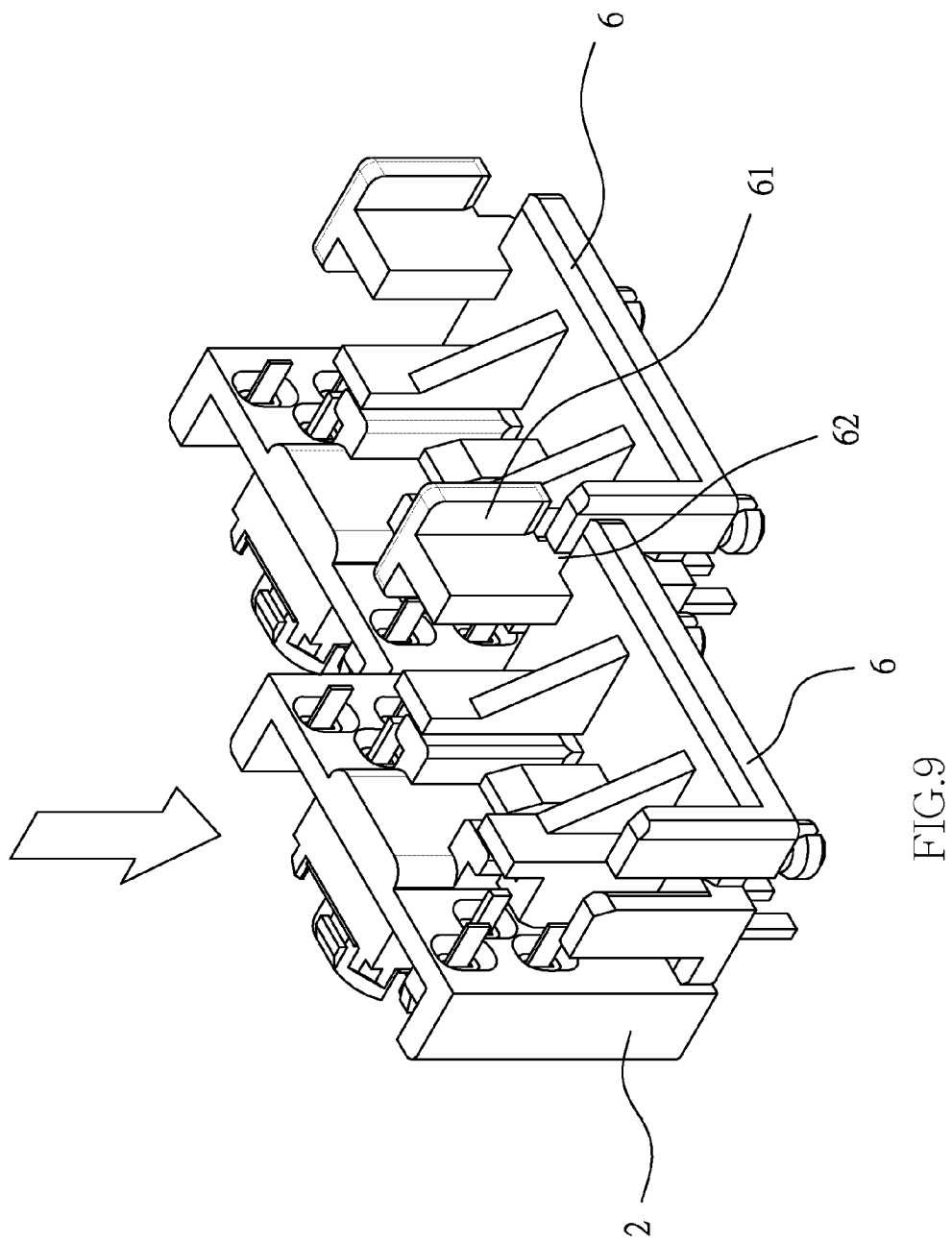
FIG. 9 is yet another schematic view of the five-direction switch base structure assembled according to the fifth embodiment of the present invention.

Referring to FIG. 7 and FIG. 8, there are shown schematic views of the five-direction switch base structure assembled according to the fifth embodiment of the present invention. As shown in the diagrams, in the fifth embodiment of the present invention, the base components 2 of the five-direction switch base structure 100 are inserted into and fixed to a bottom rest component 6 in a one-to-one manner to form another base structural body. A side-by-side slide slot 60 is disposed on one of the four sides of the bottom rest component 6 and corresponds in position to the sliding rail 20 of the base components 2 to enable the base components 2 to be inserted into the bottom rest component 6. A snap-engaging portion 61 and a snap-engaging slot 62 are disposed on two opposing ones of the four sides of the bottom rest component 6, respectively. The snap-engaging portion 61 and the snap-engaging slot 62 of another said bottom rest component 2 are snap-engaged with each other so as to connect the bottom rest components 2 in series. In the fifth embodiment of the present invention, the aforesaid five installation directions of the base structural body can function separately to therefore display another series-connected side-by-side pattern and be implemented either by means of a single bottom rest component 6 and the base components 2 or by means of two to four bottom rest components 6 and the base components 2.

What is claimed is:

1. A five-direction switch base structure, mounted on a circuit board, comprising:
   a bottom rest having a receiving space defined centrally at the bottom rest and four coupling portions disposed on four sides of the bottom rest, respectively; and
   four base components each having a side disposed with a receiving portion and another side disposed with a coupling end corresponding in position to a corresponding one of the coupling portions on the four sides of the bottom rest to thereby enable the base components to be fixed to the bottom rest, thereby forming a base structural body,
   wherein the base structural body comprising the bottom rest and the base components enables switch installation to take place in five directions, namely forward, backward, leftward, rightward, and upward, such that a switch can be selectively installed at the receiving space or the receiving portion in each of the directions and thus displayed in various patterns.

2. The five-direction switch base structure of claim 1, wherein the receiving space receives a self-luminous push switch, and the self-luminous push switch is disposed with a plurality of pins from below, the pins penetrating the bottom rest to get electrically connected to the circuit board on which the five-direction switch base structure is mounted.

3. The five-direction switch base structure of claim 2, wherein the self-luminous push switch has thereon a press cap, and a user can press the press cap from outside.

4. The five-direction switch base structure of claim 1, wherein the coupling portion is a slide slot.

5. The five-direction switch base structure of claim 1, wherein a self-luminous tactile switch is disposed at the receiving portion on a side of each of the base components.

6. The five-direction switch base structure of claim 1, wherein the coupling end is a sliding rail.

7. The five-direction switch base structure of claim 1, wherein a pin group is disposed below each of the base components and electrically connected to the circuit board.

8. The five-direction switch base structure of claim 7, wherein the pin groups are formed inside the base components by means of embedding mold injection.

9. The five-direction switch base structure of claim 1, further comprising at least an outer cover covering the receiving space from above, corresponding in position to the four sides of the bottom rest, and having a through-hole selectively centrally disposed at the at least an outer cover, wherein, after the base components have been coupled together to form the base structural body, the through-hole enables the base components to be fixed to each other by means of the at least an outer cover so as to form at least a connection layer.

10. The five-direction switch base structure of claim 9, wherein the at least an outer cover comprises a first outer cover having a first through-hole centrally disposed at the first outer cover and four snap-engaging holes disposed at four corners of the first outer cover, respectively.

11. The five-direction switch base structure of claim 9, wherein the at least an outer cover comprises a second outer cover having a second through-hole centrally disposed at the second outer cover, and bottoms of two opposing sides of the second outer cover extend downward to form two hook-engaging holes.

12. The five-direction switch base structure of claim 1, wherein the base components each have a side disposed with two hook-engaging protuberances and are each disposed above with two snap-engaging raises, wherein two snap-engaging raises are positioned proximate to the base components and correspond in position thereto, respectively, such that the base components are coupled together to form the base structural body and thereby form a single cylindrical raise.

13. The five-direction switch base structure of claim 1, wherein the base components are fixed to bottom rest components, respectively, to collectively form another base structural body.

14. The five-direction switch base structure of claim 13, wherein a side-by-side slide slot is disposed at one of the four sides of the bottom rest component and corresponds in position to a sliding rail of the base components.

15. The five-direction switch base structure of claim 13, wherein a snap-engaging portion and a snap-engaging slot are disposed at two opposing ones of the four sides of the bottom rest component, respectively, and the snap-engaging portion and the snap-engaging slot of another said bottom rest component are snap-engaged with each other, thereby connecting the bottom rest components in series.

* * * * *